United States Patent
Barmichev et al.

(10) Patent No.: US 9,902,485 B2
(45) Date of Patent: Feb. 27, 2018

(54) AIRLINE DOOR RETRACTABLE WAVE FENCE WITH STEPS FOR EVACUATION

(71) Applicant: THE BOEING COMPANY, Chicago, IL (US)

(72) Inventors: Sergey Barmichev, Chicago, IL (US); Mithra Sankrithi, Chicago, IL (US); David Eckert, Chicago, IL (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 14/311,105

(22) Filed: Jun. 20, 2014

(65) Prior Publication Data
US 2015/0367944 A1    Dec. 24, 2015

(51) Int. Cl.
| | | |
|---|---|---|
| *B64D 25/14* | (2006.01) | |
| *B64C 1/24* | (2006.01) | |
| *B64D 25/08* | (2006.01) | |
| *B64D 25/18* | (2006.01) | |

(52) U.S. Cl.
CPC ............... *B64C 1/24* (2013.01); *B64D 25/08* (2013.01); *B64D 25/14* (2013.01); *B64D 25/18* (2013.01); *Y10S 244/905* (2013.01)

(58) Field of Classification Search
CPC ........ B64D 25/00; B64D 25/08; B64D 25/14; B64D 25/18; B64B 43/24; B64B 43/32; E04H 9/145
USPC .............. 244/905, 137.2, 107, 129.6; 182/35
See application file for complete search history.

(56) References Cited

U.S. PATENT DOCUMENTS

| | | | | |
|---|---|---|---|---|
| 2,765,131 | A * | 10/1956 | Boyle | B64D 25/14 244/137.2 |
| 4,981,391 | A * | 1/1991 | Klementovich | E02B 7/005 405/52 |
| 5,005,667 | A * | 4/1991 | Anderson | A47B 77/10 182/15 |
| 5,009,282 | A * | 4/1991 | Willsher | E06C 1/387 182/129 |
| 6,029,405 | A * | 2/2000 | Wood | E04H 3/14 52/169.14 |
| 6,109,563 | A * | 8/2000 | Verhoeven | B64C 1/1407 244/129.5 |
| 6,189,833 | B1 * | 2/2001 | Ambrose | B64C 1/1407 244/118.3 |
| 6,425,707 | B1 * | 7/2002 | Baxter | E04H 9/145 405/104 |

(Continued)

OTHER PUBLICATIONS

Luxair Q400 Saftey Card, delcampe.net, Dec. 10, 2011, found at http://www.delcampe.net/page/item/id,153746078,var,Consignes-de-Securite-=-BOMBARDIER-Q400--LUXAIR,language,E.html.*

(Continued)

*Primary Examiner* — Marc Burgess
(74) *Attorney, Agent, or Firm* — Haynes and Boone, LLP

(57) ABSTRACT

Systems, methods, and apparatus for permitting evacuation of an aircraft following a water landing are disclosed. In one or more embodiments, the disclosed method involves deploying, an evacuation unit, from inside a storage housing located proximate a door of the aircraft. In one or more embodiments, the evacuation unit comprises at least one step and a wave fence. In at least one embodiment, when the evacuation unit is fully deployed, at least a portion of the wave fence is in water-tight contact with at least a portion of a frame of the door such that water flow into the aircraft is prevented and/or inhibited.

17 Claims, 14 Drawing Sheets

(56) References Cited

U.S. PATENT DOCUMENTS

| | | | | |
|---|---|---|---|---|
| 6,457,677 | B2* | 10/2002 | Dazet | B64D 25/14 244/137.1 |
| 6,659,404 | B1* | 12/2003 | Roemke | B64D 25/14 244/137.2 |
| 7,690,865 | B1* | 4/2010 | Stewart | E02B 3/108 405/114 |
| 7,963,075 | B2* | 6/2011 | Howland | A62C 2/10 160/40 |
| 2003/0167696 | A1* | 9/2003 | Chen | E02B 3/102 49/477.1 |
| 2009/0206200 | A1* | 8/2009 | Bolder | B64D 25/16 244/118.5 |
| 2010/0006527 | A1* | 1/2010 | Kalwat | A47F 5/116 211/135 |
| 2013/0334368 | A1 | 12/2013 | Sankrithi et al. | |
| 2014/0109482 | A1* | 4/2014 | Rakhmanin | E06B 9/00 49/463 |
| 2014/0290104 | A1* | 10/2014 | Lindblom | G09F 15/0025 40/559 |

OTHER PUBLICATIONS

Flybe Q400 Saftey Card, my-safetycard.de, Feb. 26, 2011, found at http://my-safetycard.de/index.php?page=searchsafetyscan&q=5555.*

DeHavilland Dash-8 Ditching Dam Description, JetCareers.com, Sep. 11, 2006, found at http://forums.jetcareers.com/threads/de-havilland-dash-8-question.32265/.*

Kay Blundell, "Airport Security to Tighten After Plane Broken Into" (Bombardier Q300 Ditching Dam Description), Mar. 12, 2011, found at http://www.stuff.co.nz/dominion-post/news/6079294/Airport-security-to-tighten-after-plane-broken-into.*

PPRuNe Forums, flybe smoke in cockpit, entry by Love_joy, dated Dec. 17, 2009, 22:59, p. 2, available at http://www.pprune.org/archive/index.php/t-399240.html.

Commonwealth of Australia Civil Aviation Safety Authority Schedule of Airworthiness Directives, Bombardier (Boeing Canada/De Havilland) DHC-8 Series Aeroplanes, Civil Aviation Regulations 1998, Part 39-105, p. 57, Ditching Dam Inflation Bottle.

\* cited by examiner

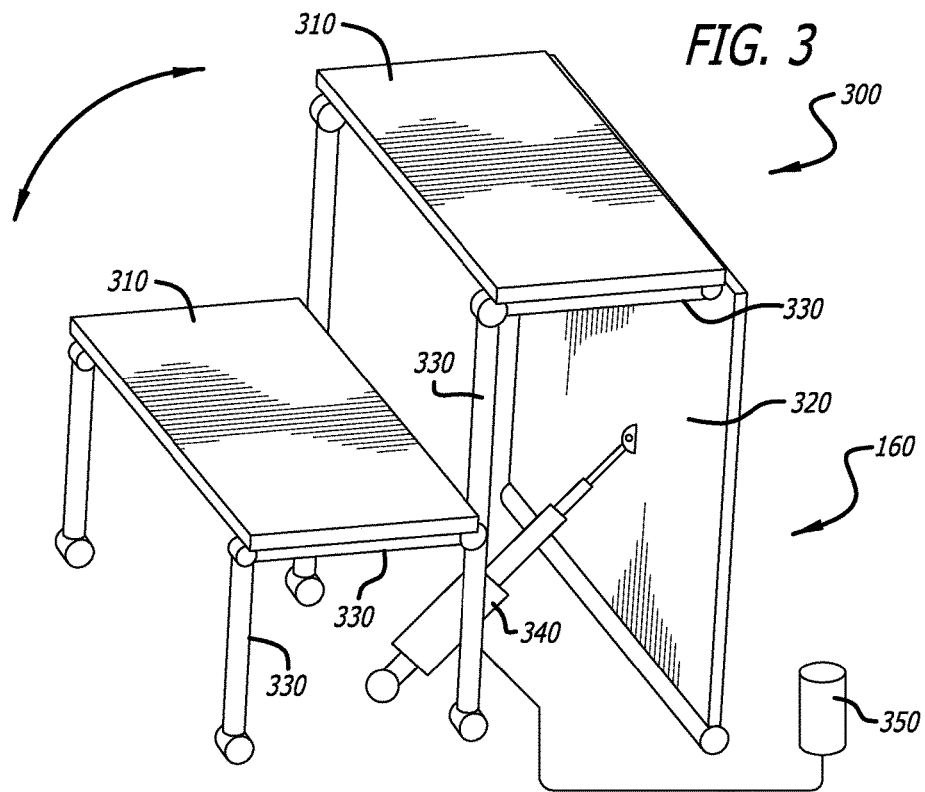
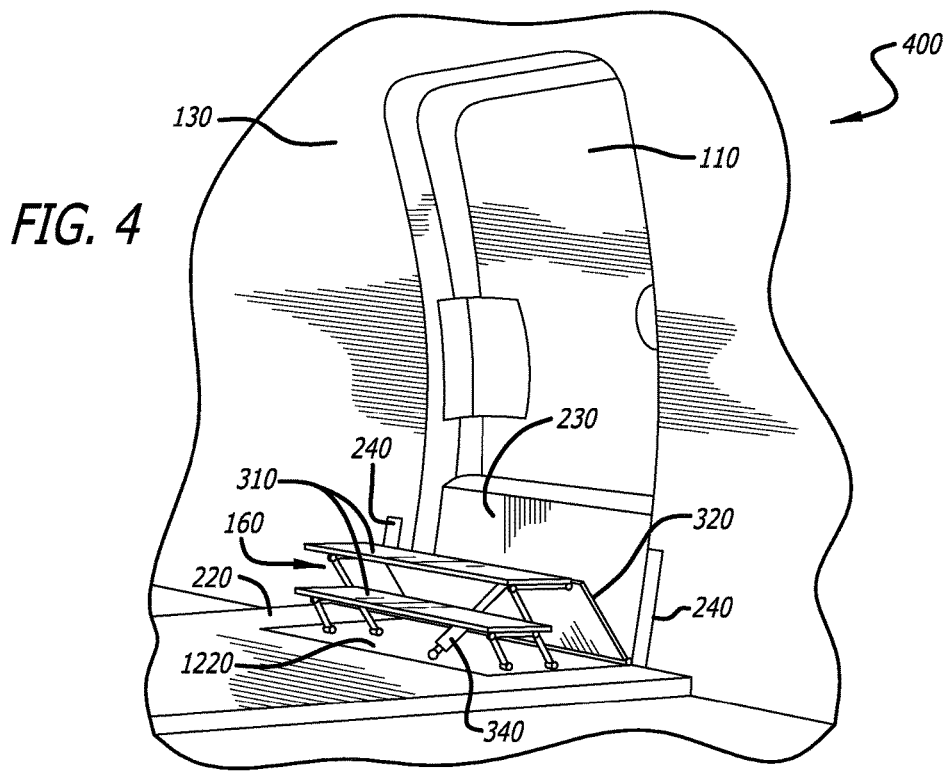

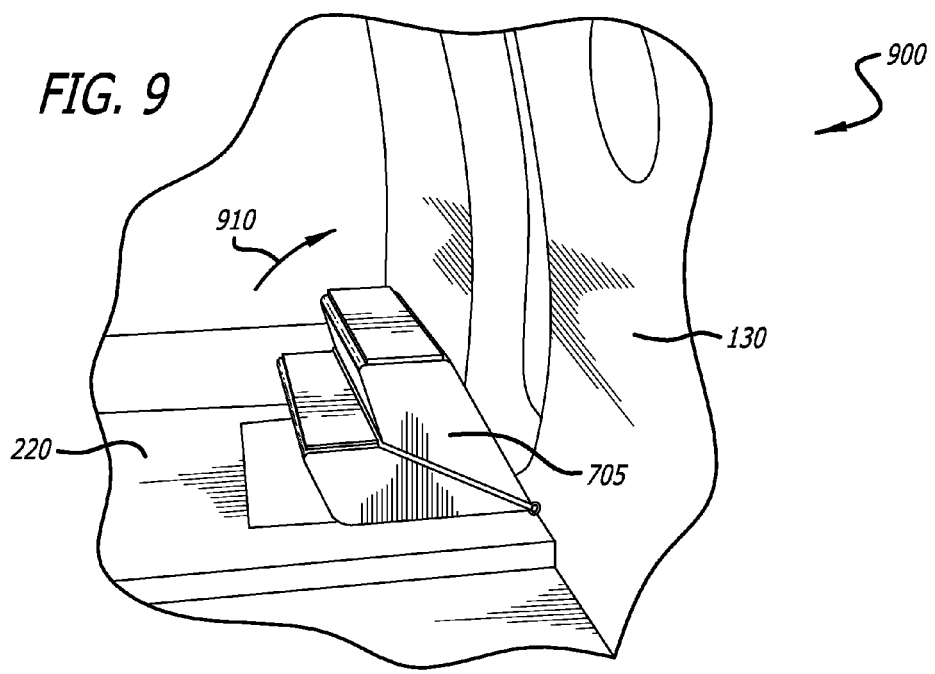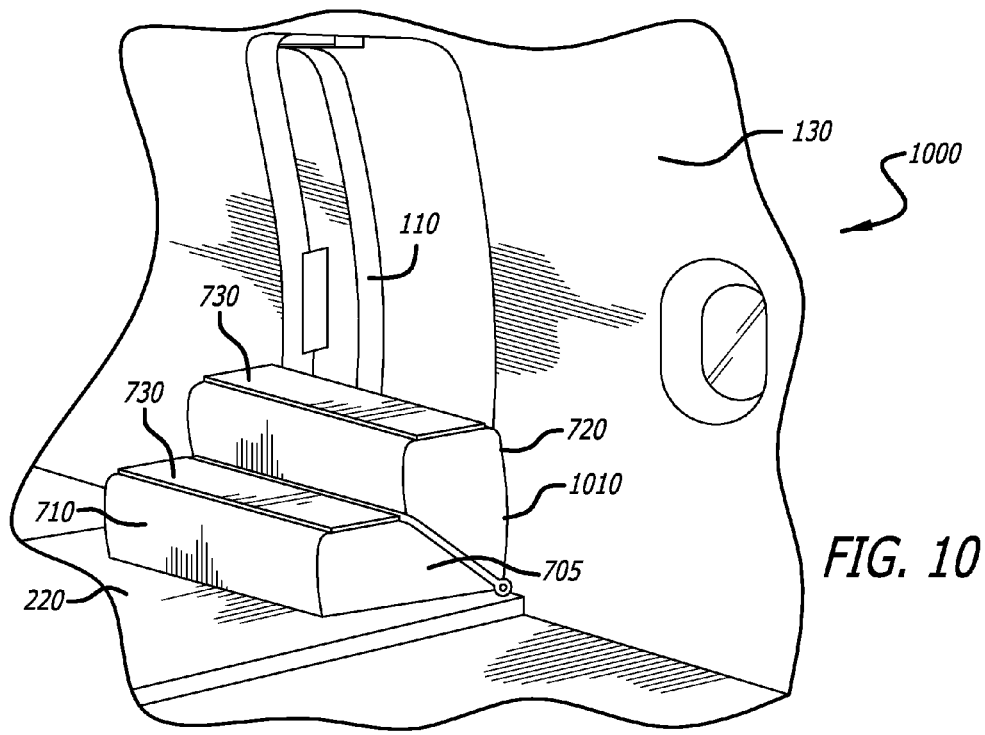

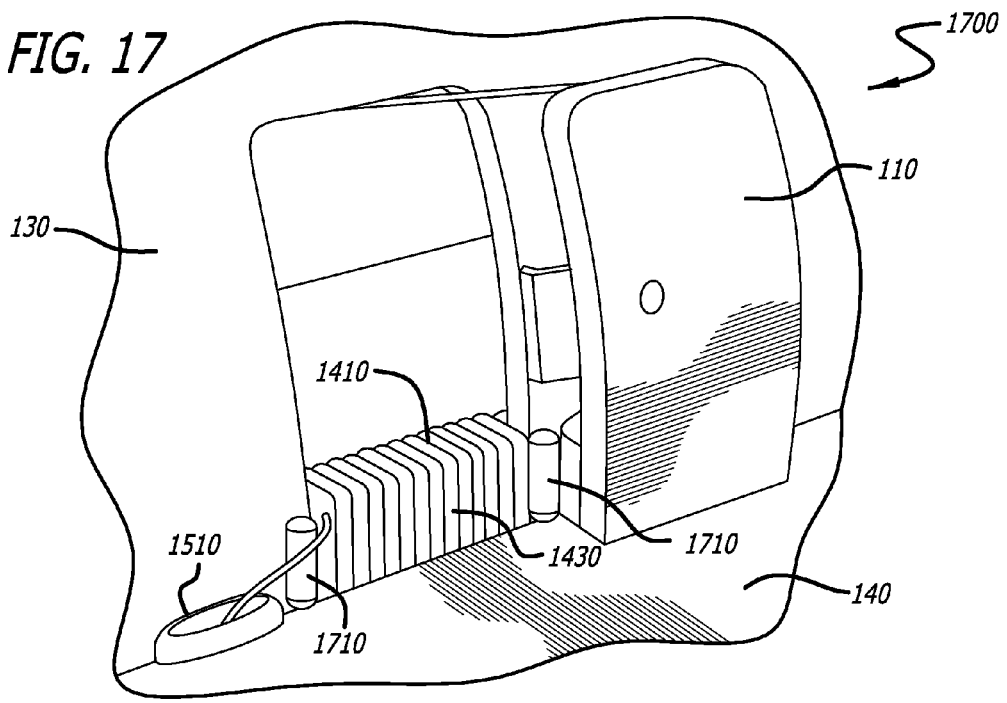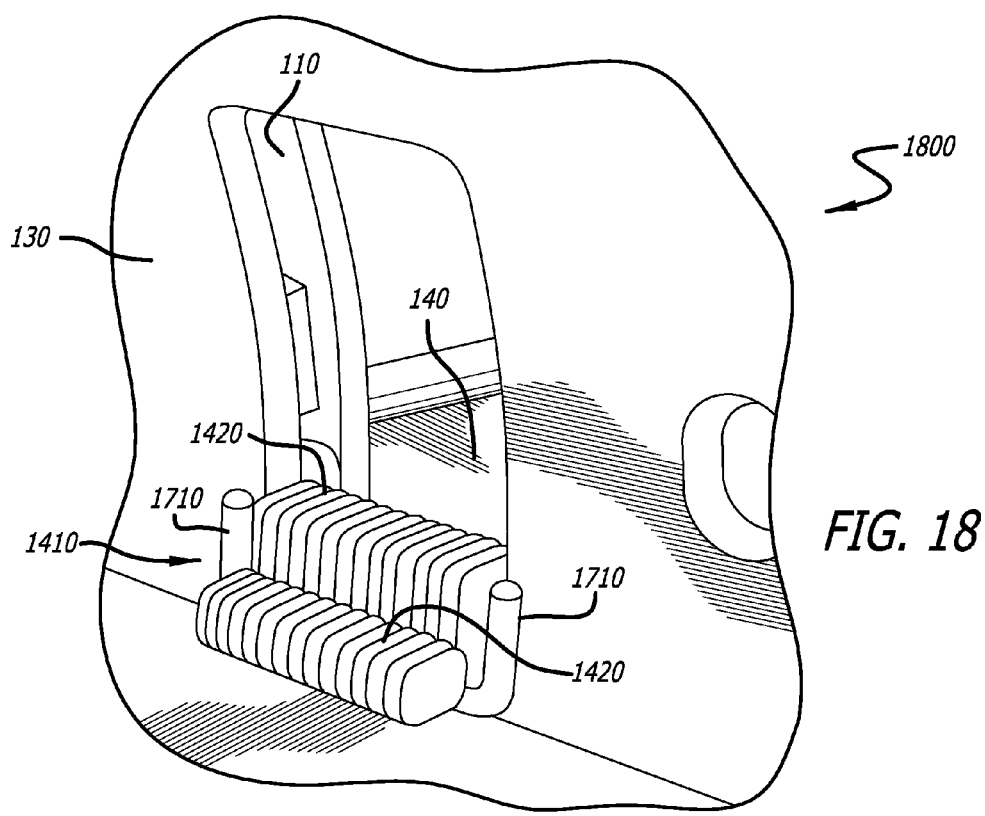

AIRLINE DOOR RETRACTABLE WAVE FENCE WITH STEPS FOR EVACUATION

FIELD

The present disclosure relates to airplane door steps for evacuation. In particular, it relates to an airplane door retractable wave fence with steps for evacuation.

BACKGROUND

In the art of commercial airplane design, there are possible situations when some of the aircraft doors cannot be used in a ditching (i.e. water landing) situation because immediately after landing on water, the water line is higher than the airplane door threshold (i.e. the door sill is negative).

Even in cases when the door sill is positive, but the water line is just a few inches lower than the door threshold, a particular door can be considered as not being usable for passenger egress subsequent to ditching. These situations may occur on multi-deck commercial airplanes, high-wing airplanes, mid-wing airplanes, and short narrow body low-wing airplanes. The door may be considered as not being usable for passenger egress for several reasons. One of the reasons is that the airplane will sink faster than it is getting lighter due to the passenger egress, so the door sill becomes negative faster than the certification requirements for a positive door sill state. Even if the door sill does not decrease, the marginally positive sill allows for waves and splashes to enter into the cabin, thereby increasing the airplane sinking rate.

As such, there is a need for a design that will allow for an evacuation of an aircraft following a water landing with a marginally positive door sill.

SUMMARY

The present disclosure relates to a method, system, and apparatus for an airplane door retractable wave fence with steps for evacuation. In one or more embodiments, a method for permitting evacuation of an aircraft following a water landing (e.g., a ditching event) involves deploying, an evacuation unit, from inside a storage housing located proximate a door of the aircraft. In one or more embodiments, the evacuation unit comprises at least one step and a wave fence. In at least one embodiment, when the evacuation unit is fully deployed, at least a portion of the wave fence is in water-tight contact with at least a portion of a frame of the door such that water flow into the aircraft is prevented and/or inhibited.

In one or more embodiments, the top step of the step(s) comprises an upper surface of the wave fence upon which an occupant evacuating the aircraft can step. In some embodiments, the storage housing is located under at least one floor panel, located on a portion of an inflatable slide, located on an interior wall of the aircraft, or located on an exterior wall of the aircraft. In at least one embodiment, the method further involves opening, the storage housing, to expose the evacuation unit for deployment.

In at least one embodiment, the evacuation unit further comprises a rigid infrastructure that is foldable. In some embodiments, the deploying of the evacuation unit comprises unfolding the rigid infrastructure by use of compressed gas, hydraulics, electrical power, pneumatics, at least one spring, and/or at least one manual pump.

In one or more embodiments, after deployment of the evacuation unit, the wave fence is located interior to the aircraft and/or exterior to the aircraft.

In at least one embodiment, the method further involves attaching, to a first location proximate a first side of the frame of the door, a first side of the wave fence; and attaching, to a second location proximate a second side of the frame of the door, a second side of the wave fence. In some embodiments, the attaching of the first side of the wave fence to the first location and the attaching of the second side of the wave fence to the second location are via at least one rail, at least one fastener, and/or at least one zipper.

In one or more embodiments, the evacuation unit is constructed from an inflatable structure. In at least one embodiment, the deploying of the evacuation unit comprises inflating the inflatable structure by use of compressed gas and/or at least one manual pump. In some embodiments, the evacuation unit further comprises a rigid infrastructure that is foldable and housed within the inflatable structure.

In at least one embodiment, the inflatable structure comprises at least three inflatable sleeves and/or an accordion structure.

In one or more embodiments, an apparatus for permitting evacuation of an aircraft following a water landing comprises at least one step and a wave fence. In at least one embodiment, the apparatus is to be deployed from inside a storage housing located proximate a door of the aircraft. In some embodiments, when the apparatus is fully deployed, at least a portion of the wave fence is in water-tight contact with at least a portion of a frame of the door such that water flow into the aircraft is prevented and/or inhibited.

In at least one embodiment, the apparatus further comprises a rigid infrastructure that is foldable. In some embodiments, the apparatus is deployed by unfolding the rigid infrastructure by use of compressed gas, hydraulics, electrical power, pneumatics, at least one spring, and/or at least one manual pump.

In one or more embodiments, the apparatus is constructed from an inflatable structure. In at least one embodiment, the apparatus is deployed by inflation of the inflatable structure by use of compressed gas and/or at least one manual pump.

In at least one embodiment, the apparatus further comprises a rigid infrastructure that is foldable and housed within the inflatable structure. In some embodiments, the inflatable structure comprises at least three inflatable sleeves and/or an accordion structure.

In one or more embodiments, a system for permitting evacuation of an aircraft following a water landing comprises an evacuation unit to be deployed from inside a storage housing. In at least one embodiment, the evacuation unit comprises at least one step and a wave fence. The system further comprises the storage housing located proximate a door of the aircraft. In one or more embodiments, when the evacuation unit is fully deployed, at least a portion of the wave fence is in water-tight contact with at least a portion of a frame of the door such that water flow into the aircraft is prevented and/or inhibited.

The features, functions, and advantages can be achieved independently in various embodiments of the present embodiments or may be combined in yet other embodiments.

DRAWINGS

These and other features, aspects, and advantages of the present disclosure will become better understood with regard to the following description, appended claims, and accompanying drawings where:

FIG. 3 is a diagram of the first embodiment of the disclosed evacuation unit, in accordance with at least one embodiment of the present disclosure.

FIG. 4 is a diagram showing an interior aircraft cabin view of the first embodiment of the disclosed evacuation unit being deployed, in accordance with at least one embodiment of the present disclosure.

FIG. 9 is a diagram showing an interior aircraft cabin view of the second embodiment of the disclosed evacuation unit being deployed, in accordance with at least one embodiment of the present disclosure.

FIG. 10 is a diagram showing an interior cabin view of the second embodiment of the disclosed evacuation unit fully deployed, in accordance with at least one embodiment of the present disclosure.

FIG. 17 is a diagram showing an exterior aircraft view of the fourth embodiment of the disclosed evacuation unit being in a fully deployed position, in accordance with at least one embodiment of the present disclosure.

FIG. 18 is a diagram showing an interior aircraft cabin view of the fourth embodiment of the disclosed evacuation unit being in a fully deployed position, in accordance with at least one embodiment of the present disclosure.

DESCRIPTION

The methods and apparatus disclosed herein provide an operative system for an airplane door retractable wave fence with steps for evacuation. The disclosed system provides an evacuation unit that allows for safe emergency evacuation following a ditching event (i.e. a water landing) when using doors with marginally positive door sill values. The evacuation unit comprises a wave fence (or dam), which typically will be stowed inside the passenger floor of the cabin of the aircraft next to the door threshold. When the wave fence is fully deployed, it will form a water-tight contact with the aircraft fuselage structure, thereby artificially increasing the positive water sill by one or more stairway steps.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

For the sake of brevity, conventional techniques and components related to the system design, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
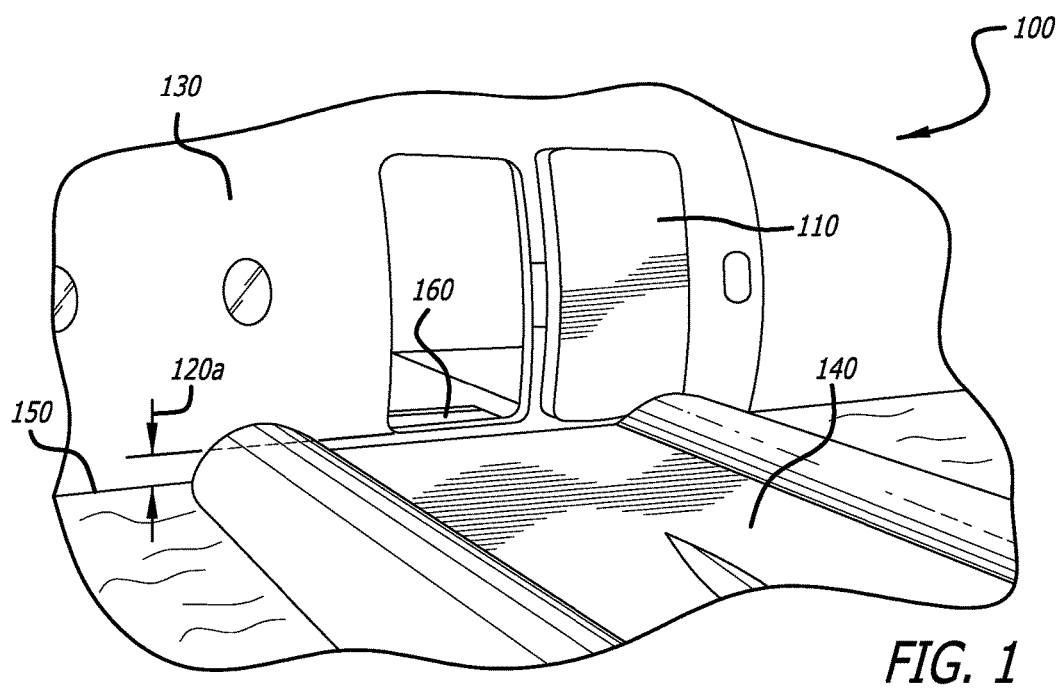
FIG. 1 is a diagram of an aircraft door with a marginally positive door sill, in accordance with at least one embodiment of the present disclosure.

FIG. 1 is a diagram 100 of an aircraft door 110 with a marginally positive door sill 120a, in accordance with at least one embodiment of the present disclosure. In this figure, an exterior view of the aircraft 130 is shown. The aircraft door 110 is shown to be open, and the evacuation slide (i.e. inflatable slide) 140 is shown to be deployed. In this figure, the water level 150 is shown to only be a few inches lower than the bottom of the aircraft door 110, thereby establishing a marginally positive door sill 120a. Also in this figure, a first embodiment of the evacuation unit 160 is shown to be in a stowed position in the cabin of the aircraft 130.

Figure 2:
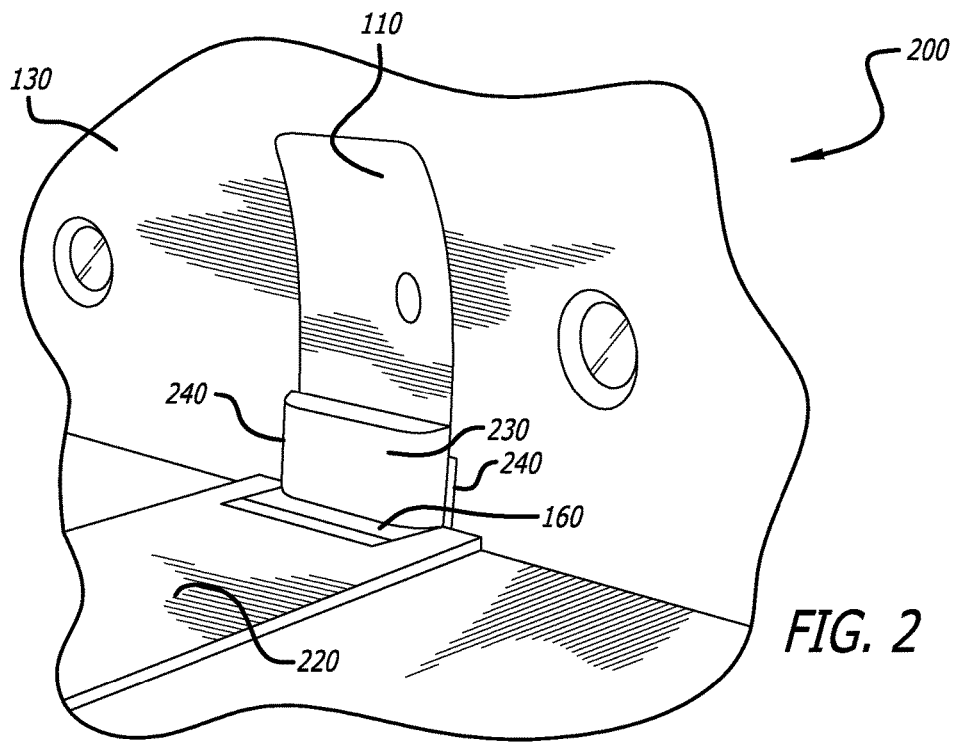
FIG. 2 is a diagram showing an interior aircraft cabin view of a first embodiment of the disclosed evacuation unit in a stowed position, in accordance with at least one embodiment of the present disclosure.

FIG. 2 is a diagram 200 showing an interior aircraft cabin view of a first embodiment of the disclosed evacuation unit 160 in a stowed position, in accordance with at least one embodiment of the present disclosure. In this figure, the aircraft door 110 is shown to be closed, and the door 110 is shown to include a storage compartment 230 for storing the evacuation slide 140.

Also in this figure, the evacuation unit 160 is shown to be in a stowed position. When stowed, the evacuation unit 160 is housed within a storage housing (not shown) located under the cabin floor and flush with at least one floor panel 220. In one or more embodiments, the floor panel 220 may have an increased thickness across the aisle, as is shown in FIG. 2, so as to receive the evacuation unit 160. It should be noted that in other embodiments, the evacuation unit 160 may be housed within a storage housing that is located under at least one floor panel, located on a portion of the inflatable side 140, located on the interior wall of the aircraft cabin, or located on the exterior wall of the aircraft 130.

Additionally in this figure, rails 240 are shown to be located on either side of the aircraft door 110. After the evacuation unit 160 is fully deployed, each side of the evacuation unit 160 is attached to each of the rails 240, respectively.

FIG. 3 is a diagram 300 of the first embodiment of the disclosed evacuation unit 160, in accordance with at least one embodiment of the present disclosure. In this figure, the evacuation unit 160 is shown to include two steps 310 and a wave fence 320. It should be noted that in other embodiments, the evacuation unit 160 may include more or less than two steps 310, as is shown in this figure. In addition, the evacuation unit 160 is shown to include a foldable, rigid infrastructure 330. The rigid infrastructure 330 is used to support the steps 310. An actuator 340 powered by compressed gas 350 is utilized to deploy the evacuation unit 160 (i.e. to unfold the rigid infrastructure 330).

It should be noted that in other embodiments, other means may be used in addition or instead of compressed gas 350 to deploy the evacuation unit 160. Types of other means that may be utilized include, but are not limited to, hydraulics, electrical power, pneumatics, at least one spring, and at least one manual pump.

Also, it should be noted that the top step of the two steps 310 comprises an upper surface of the wave fence 320, where an evacuating occupant of the aircraft 130 can step on the upper surface for egress.

FIG. 4 is a diagram 400 showing an interior aircraft cabin view of the first embodiment of the disclosed evacuation unit 160 being deployed, in accordance with at least one embodiment of the present disclosure. In this figure, the aircraft door 110 is shown to be starting to open, and the actuator 340 is shown to be in the process of deploying the evacuation unit 160, where its wave fence 320 is shown to be partly deployed.

Figure 5:
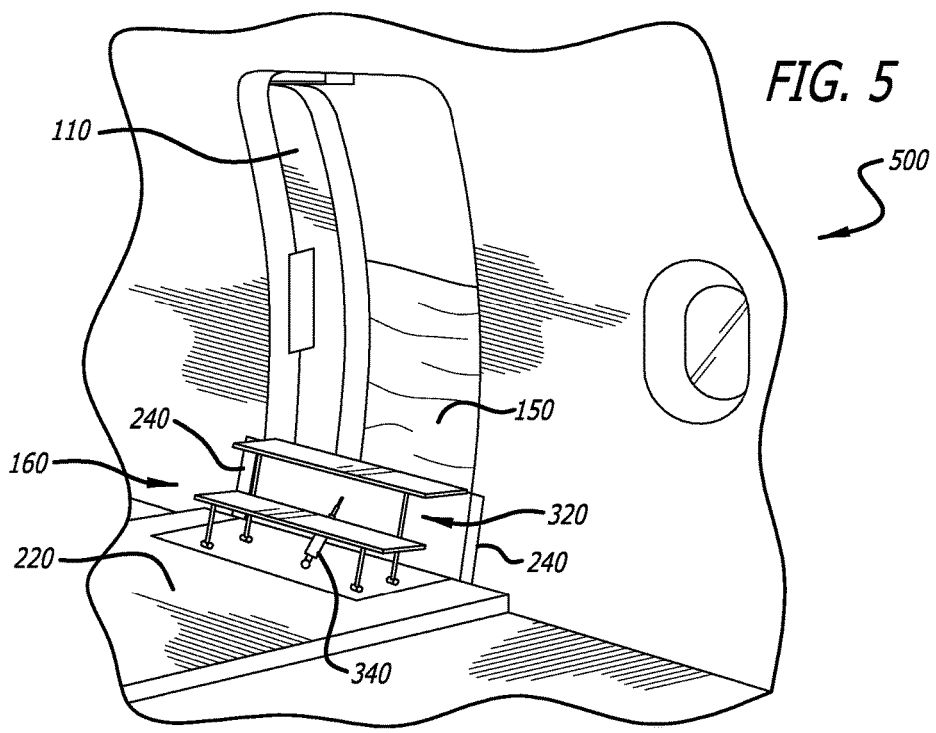
FIG. 5 is a diagram showing an interior aircraft cabin view of the first embodiment of the disclosed evacuation unit fully deployed, in accordance with at least one embodiment of the present disclosure.

FIG. 5 is a diagram 500 showing an interior aircraft cabin view of the first embodiment of the disclosed evacuation unit 160 fully deployed, in accordance with at least one embodiment of the present disclosure. In this figure the actuator 340 has fully deployed the evacuation unit 160 from the storage housing 1220, which is located under the cabin floor and flush with at least one floor panel 220. The each side of the wave fence 320 of the evacuation unit 160 is attached to each of the rails 240, such that the wave fence 320 is forced against the frame of the aircraft door 110 and at least a portion of the wave fence 320 forms a water-tight contact with a portion of the interior cabin of the aircraft 130. It should be noted that the frame of the aircraft door 110 is the open structure that is located in between the interior of the aircraft 130 and the exterior of the aircraft 130, and that receives the edges of the door 110 when the door 110 is in a closed position.

It should be noted that in other embodiments, the wave fence 320 is attached by means other than rails 240. Examples of other means that may be utilized to attach the wave fence 320 include, but are not limited to, at least one fastener and at least one zipper.

Figure 6:
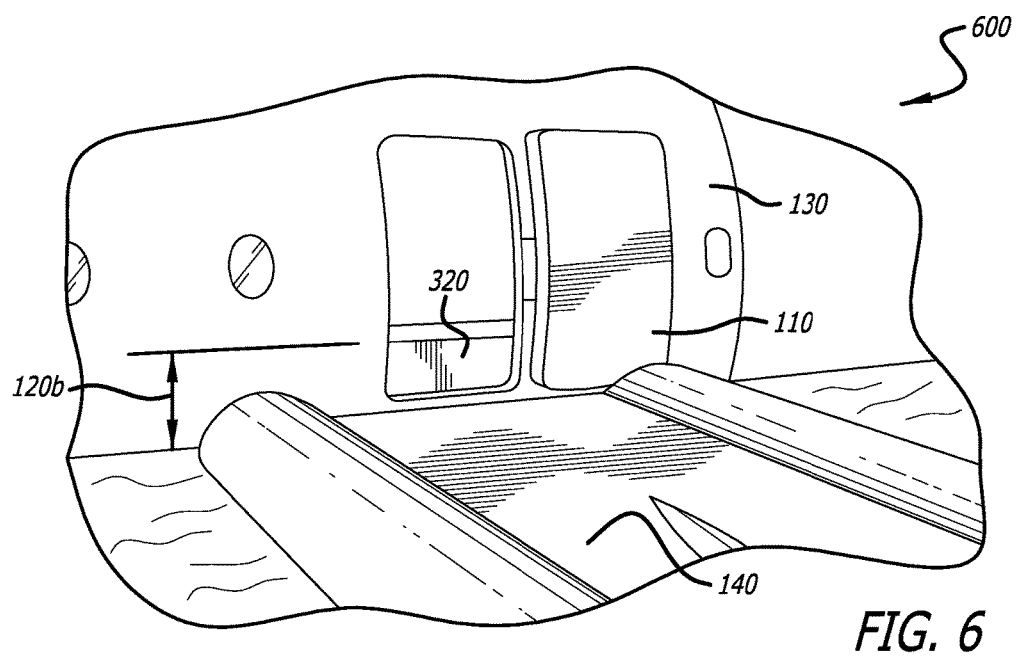
FIG. 6 is a diagram showing an exterior aircraft view of the first embodiment of the disclosed evacuation unit fully deployed, in accordance with at least one embodiment of the present disclosure.

FIG. 6 is a diagram 600 showing an exterior aircraft view of the first embodiment of the disclosed evacuation unit 160 fully deployed, in accordance with at least one embodiment of the present disclosure. This figure shows that after the evacuation unit 160 is fully deployed, the water sill 120b has significantly increased, thereby allowing for the aircraft door 110 to be utilized for passenger egress.

Figure 7A:
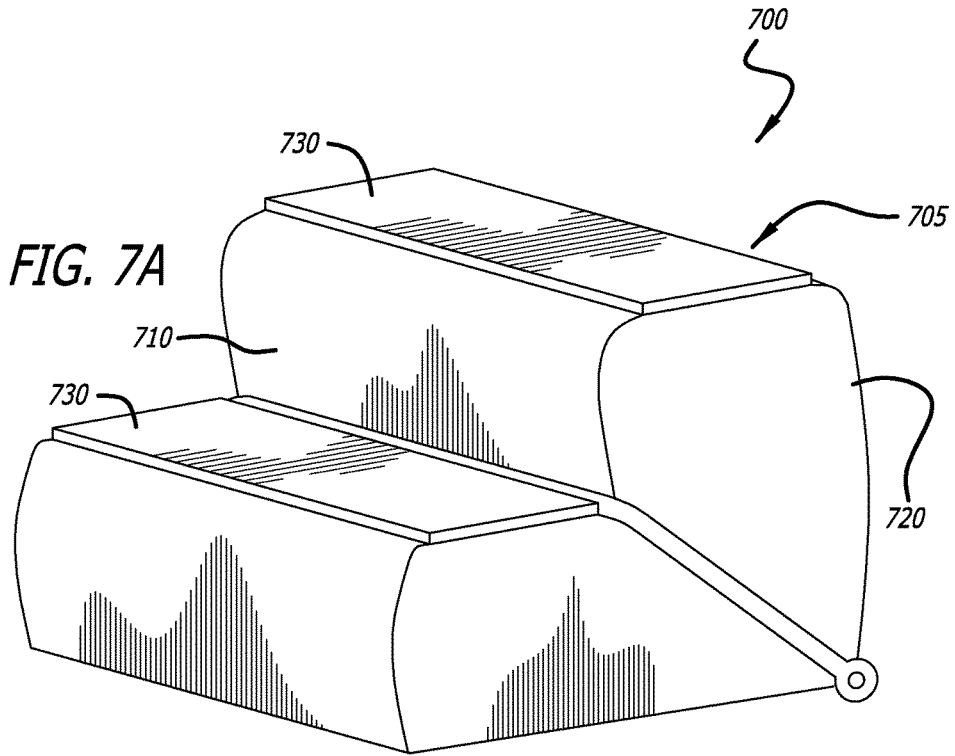
FIG. 7A is a diagram of a second embodiment of the disclosed evacuation unit, in accordance with at least one embodiment of the present disclosure.

FIG. 7A is a diagram 700 of a second embodiment of the disclosed evacuation unit, in accordance with at least one embodiment of the present disclosure. In this figure, the evacuation unit 705 is constructed from an inflatable structure 710. The evacuation unit 705 may be deployed (i.e. the inflatable structure 710 is inflated) by use of compressed gas and/or at least one manual pump.

In addition, the evacuation unit 705 is shown to include two steps 730 and a wave fence 720. Additionally, the evacuation unit 705 may or may not include a foldable, rigid infrastructure (not shown) that is housed within the inflatable structure 710.

Figure 7B:
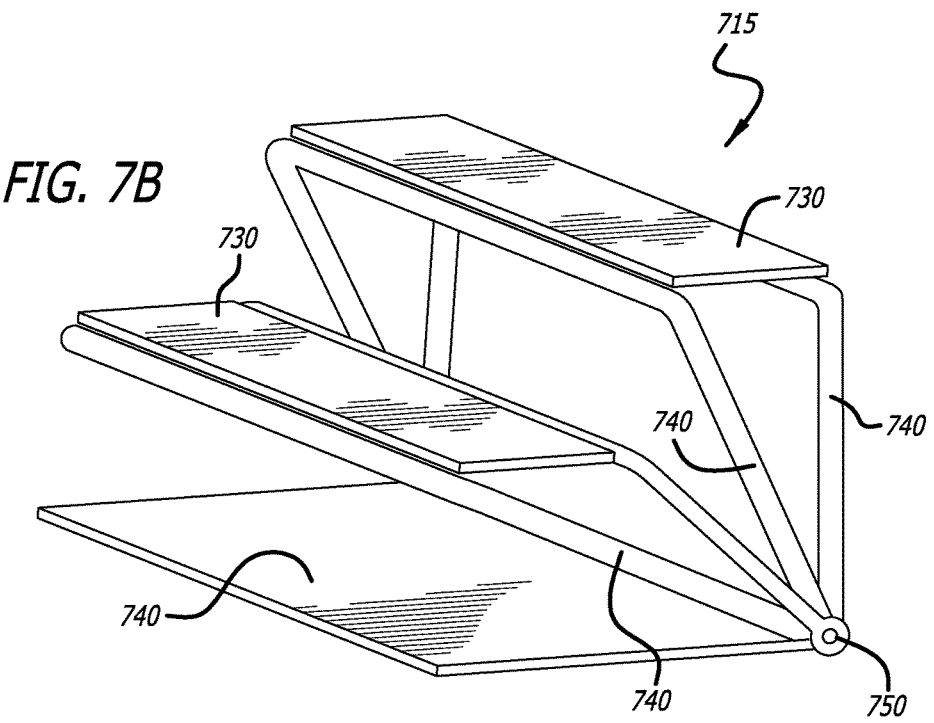
FIG. 7B is a diagram showing a foldable rigid infrastructure of the second embodiment of the disclosed evacuation unit, in accordance with at least one embodiment of the present disclosure.

FIG. 7B is a diagram 715 showing a foldable rigid infrastructure 740 of the second embodiment of the disclosed evacuation unit 705, in accordance with at least one embodiment of the present disclosure. In this figure, the foldable rigid infrastructure 740 is used to support the steps 730. Also shown in this figure, the rigid infrastructure 740 includes a pivot 750 on each side to allow for the folding of the rigid infrastructure 740.

Figure 8A:
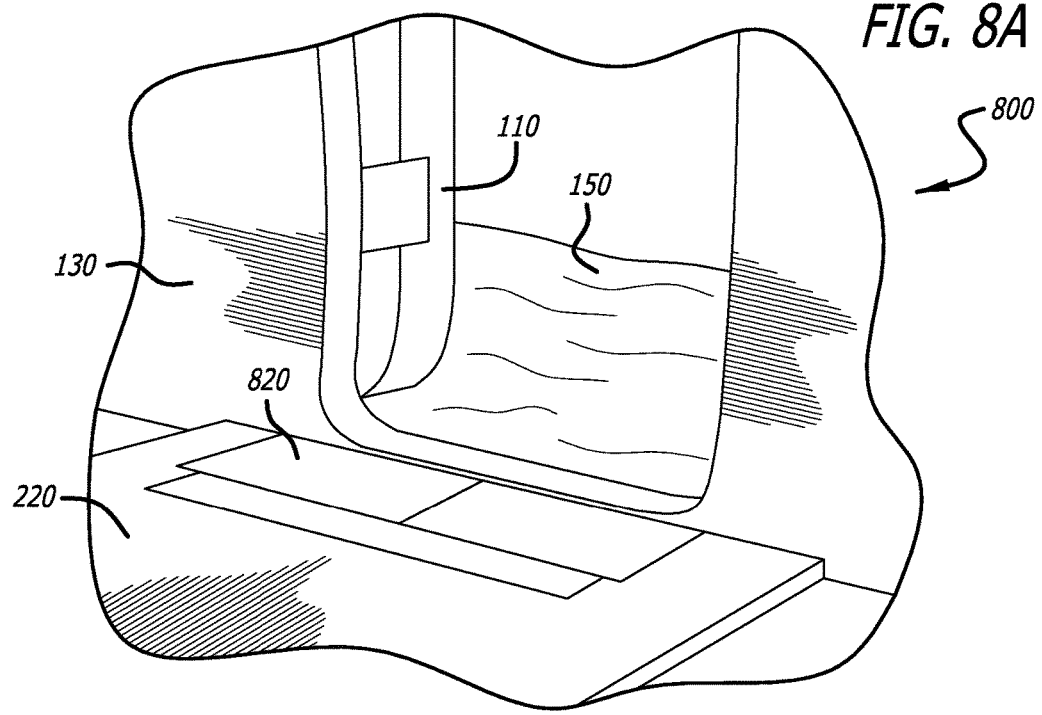
FIG. 8A is a diagram showing an interior aircraft cabin view of the second embodiment of the disclosed evacuation unit in a stowed position with the floor panels closed, in accordance with at least one embodiment of the present disclosure.

FIG. 8A is a diagram 800 showing an interior aircraft cabin view of the second embodiment of the disclosed evacuation unit (not shown) in a stowed position with the floor panels 820 closed, in accordance with at least one embodiment of the present disclosure. In this figure, the aircraft door 110 is shown to be open, thereby exposing the water surface (i.e. the water level) 150.

Also in this figure, the evacuation unit (not shown) is in a stowed position. When stowed, the evacuation unit is housed within a storage housing (not shown) located under the removable floor panels 820, which are flush with at least one floor panel 220. In one or more embodiments, the floor panel 220 may have an increased thickness across the aisle, as is shown in FIG. 8A, so as to receive the evacuation unit.

It should be noted that in other embodiments, the evacuation unit may be housed within a storage housing that is located on a portion of the inflatable side 140, located on the interior wall of the aircraft cabin, or located on the exterior wall of the aircraft 130. For the purpose of clear definition, any wall that is not exposed to the airstream external to the aircraft 130 is considered an interior wall. So, for example, the walls on the interior of the door 110 opening are considered to be interior walls.

Figure 8B:
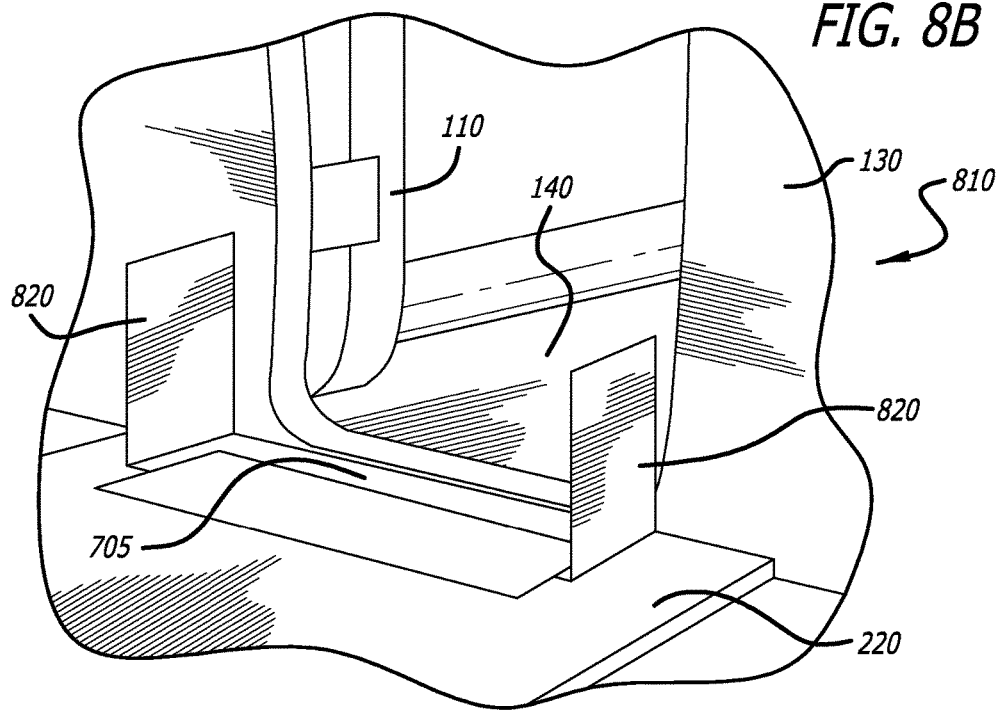
FIG. 8B is a diagram showing an interior aircraft cabin view of the second embodiment of the disclosed evacuation unit in a stowed position with the floor panels opened, in accordance with at least one embodiment of the present disclosure.

FIG. 8B is a diagram 810 showing an interior aircraft cabin view of the second embodiment of the disclosed evacuation unit 705 in a stowed position with the floor panels 820 opened, in accordance with at least one embodiment of the present disclosure. In this figure, the aircraft door 110 is shown to be open, and the inflatable slide 140 is deployed. Also in this figure, the removable floor panels 820 are shown to be open, thereby exposing the evacuation unit 705 to be deployed.

FIG. 9 is a diagram 900 showing an interior aircraft cabin view of the second embodiment of the disclosed evacuation unit 705 being deployed, in accordance with at least one embodiment of the present disclosure. In this figure, the evacuation unit 705 is shown to be in the process of being deployed. The direction of deployment of the evacuation unit is denoted by arrow 910.

FIG. 10 is a diagram 1000 showing an interior aircraft cabin view of the second embodiment of the disclosed evacuation unit 705 fully deployed, in accordance with at least one embodiment of the present disclosure. In this figure, the evacuation unit 705 is shown to be fully deployed. When the evacuation unit 705 is fully deployed, the steps 730 are fully stabilized by the internal pressure of the inflatable structure 710 of the evacuation unit 705, and the internal pressure of the inflatable structure 710 forces the wave fence 720 of the evacuation unit 705 against the frame of the aircraft door 110 such that at least a portion of the wave fence 720 in water-tight contact with at least a portion of the interior cabin of the aircraft 130.

Figure 11A:
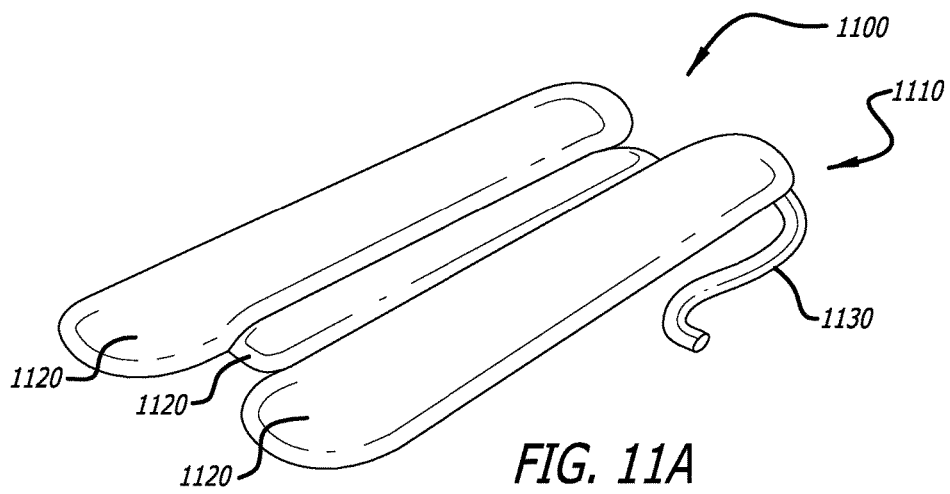
FIG. 11A is a diagram showing a top view of a third embodiment of the disclosed evacuation unit, in accordance with at least one embodiment of the present disclosure.

FIG. 11A is a diagram 1100 showing a top view of a third embodiment of the disclosed evacuation unit 1110, in accordance with at least one embodiment of the present disclosure. In this figure, the evacuation unit 1110 is shown to be constructed from an inflatable structure. The inflatable structure includes three inflatable sleeves 1120. It should be noted that in other embodiments, the evacuation unit 1110 may be constructed to have more or less than the three inflatable sleeves, shown in this figure. In addition, the evacuation unit 1110 is shown to include an inflating hose 1130. A source of air (not shown) is attached to the open end of the inflating hose 1130, and the source of air causes air to pass through the inflating hose 1130 and into the evacuation unit 1110 to inflate the evacuation unit 1110. Various means may be used for the source of air including, but not limited to, compressed air and/or at least one manual pump.

Figure 11B:
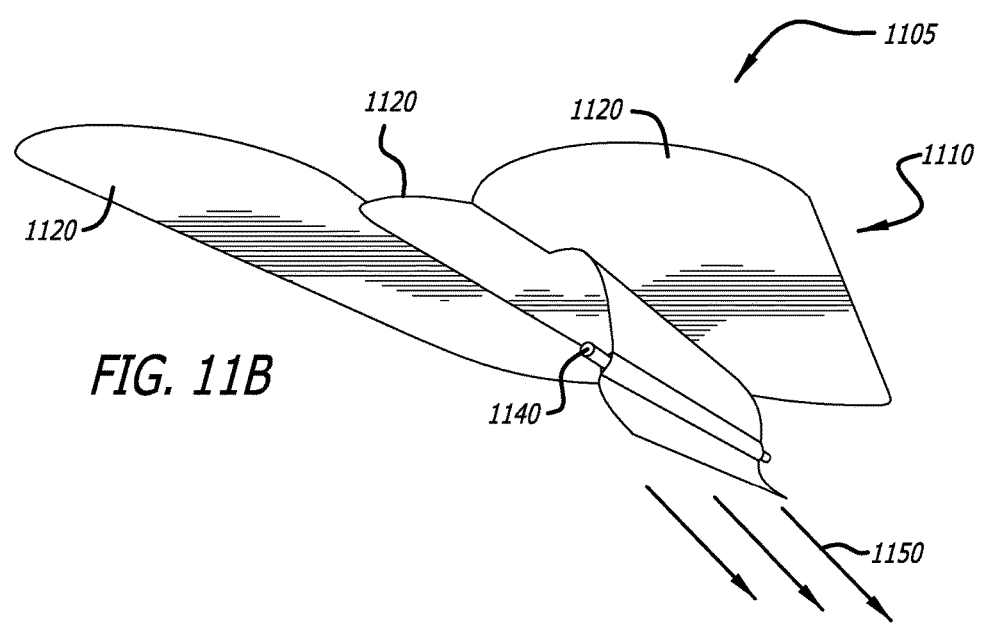
FIG. 11B is a diagram showing a bottom view of the third embodiment of the disclosed evacuation unit, in accordance with at least one embodiment of the present disclosure.

FIG. 11B is a diagram 1105 showing a bottom view of the third embodiment of the disclosed evacuation unit 1110, in accordance with at least one embodiment of the present disclosure. In this figure, the evacuation unit 1110 is shown to include a girt bar 1140. The girt bar 1140 is used to secure the evacuation unit 1110 to the aircraft door frame or to the inflatable slide. The direction of arrows 1150 illustrate the direction that the girt bar 1140 is moved to secure the girt bar 1140 appropriately.

Figure 12A:
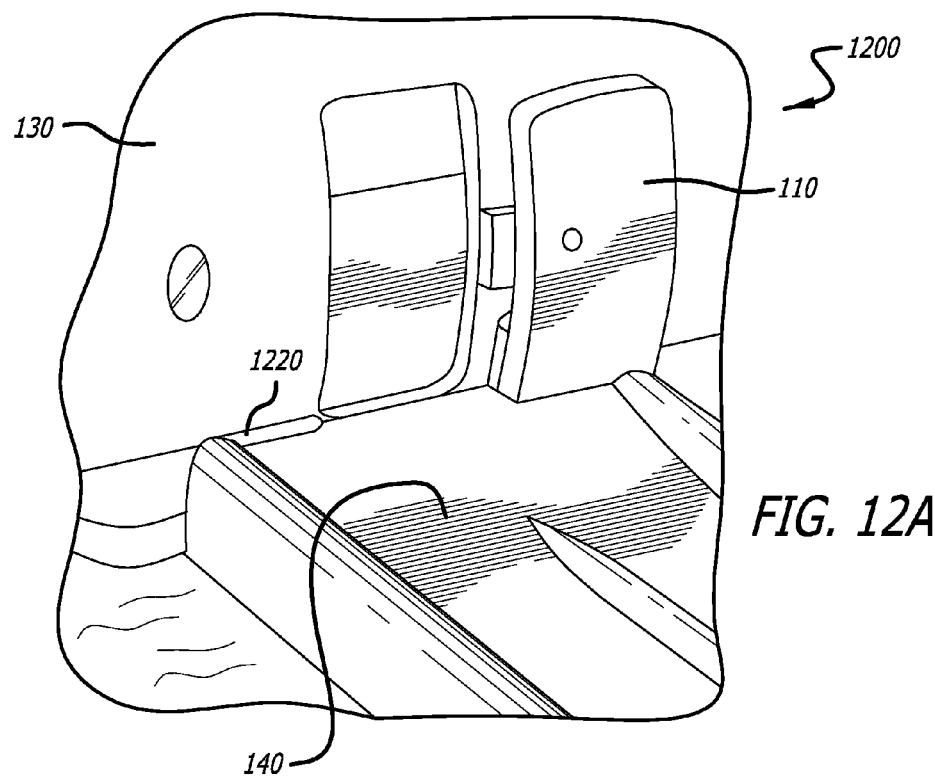
FIG. 12A is a diagram showing an exterior aircraft view of the third embodiment of the disclosed evacuation unit in a stowed position, in accordance with at least one embodiment of the present disclosure.

FIG. 12A is a diagram 1200 showing an exterior aircraft view of the third embodiment of the disclosed evacuation unit 1110 in a stowed position, in accordance with at least one embodiment of the present disclosure. In this figure, the aircraft door 110 of the aircraft 130 is shown to be open. Also in this figure, the inflatable slide 140 is shown to be deployed, and the inflatable slide 140 is shown to include a storage compartment (i.e. a storage housing) 1220 located near the aircraft door 110.

Also in this figure, the evacuation unit 1110 is shown to be in a stowed position. When stowed, the evacuation unit 1110 is housed within the storage housing 1220.

Figure 12B:
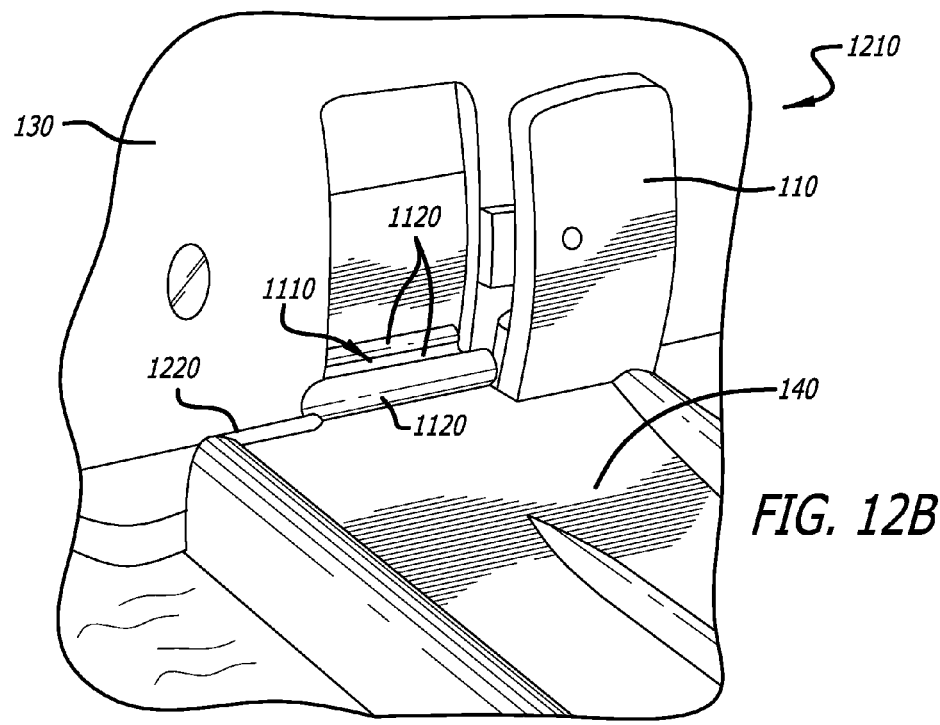
FIG. 12B is a diagram showing an exterior aircraft view of the third embodiment of the disclosed evacuation unit in a fully deployed position, in accordance with at least one embodiment of the present disclosure.

FIG. 12B is a diagram 1210 showing an exterior aircraft view of the third embodiment of the disclosed evacuation unit 1110 in a fully deployed position, in accordance with at least one embodiment of the present disclosure. For deployment of the evacuation unit 1110, the storage housing 1220 is opened to expose the evacuation unit 1110. The evacuation unit 1110 is removed from the storage housing 1220 and positioned within the frame of the aircraft door 110. Then, a source of air is used to inflate the evacuation unit 1110 such that it is fully deployed. When the evacuation unit 1110 is fully deployed, a first sleeve 1120 of the evacuation unit 1110 lies within the cabin of the aircraft 130, a second sleeve 1120 of the evacuation unit 1110 lies within the frame of the aircraft door 110, and a third sleeve 1120 of the evacuation unit 1110 lies exterior to the aircraft 130, thereby creating a wave fence.

Figure 13A:
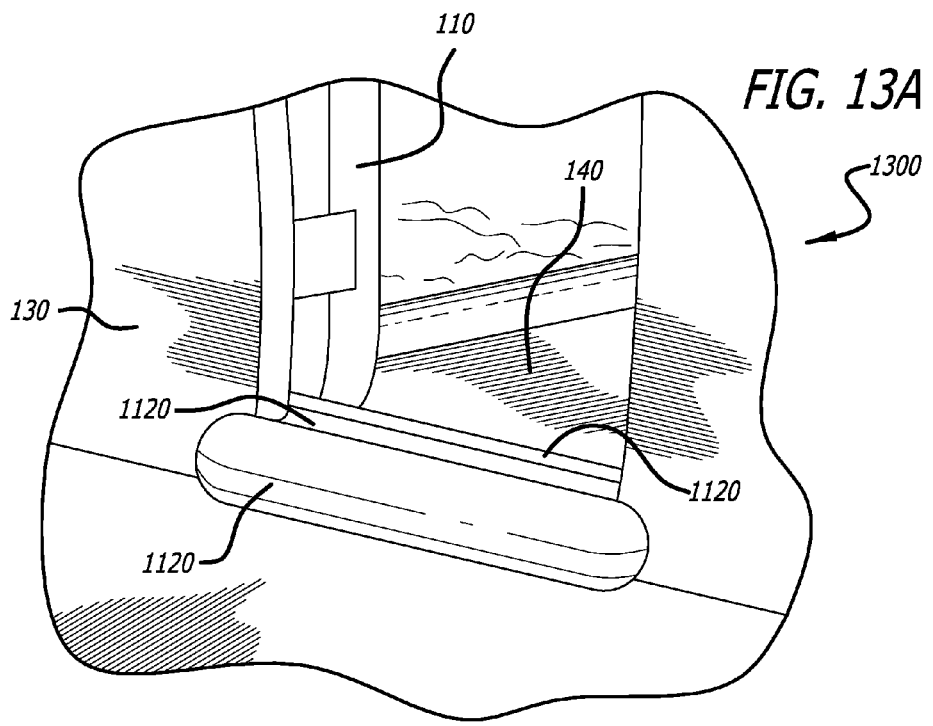
FIG. 13A is a diagram showing an interior aircraft cabin view of the third embodiment of the disclosed evacuation unit in a fully deployed position, in accordance with at least one embodiment of the present disclosure.

FIG. 13A is a diagram 1300 showing an interior aircraft cabin view of the third embodiment of the disclosed evacuation unit 1110 in a fully deployed position, in accordance with at least one embodiment of the present disclosure.

Figure 13B:
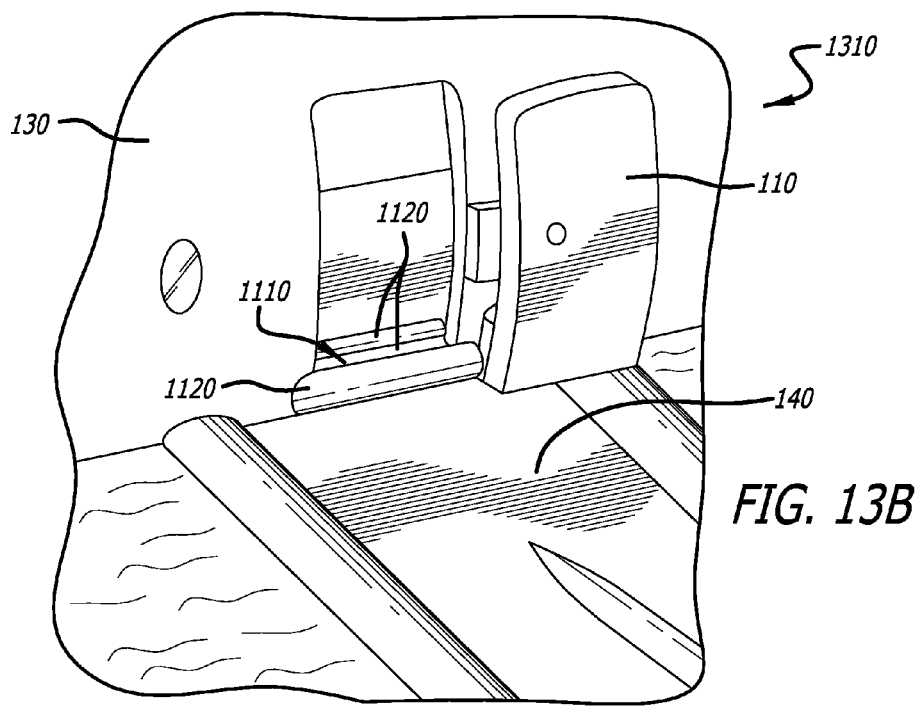
FIG. 13B is a diagram showing an exterior aircraft view of the third embodiment of the disclosed evacuation unit in a fully deployed position, in accordance with at least one embodiment of the present disclosure.

FIG. 13B is a diagram 1310 showing an exterior aircraft view of the third embodiment of the disclosed evacuation unit 1110 in a fully deployed position, in accordance with at least one embodiment of the present disclosure.

Figure 14A:
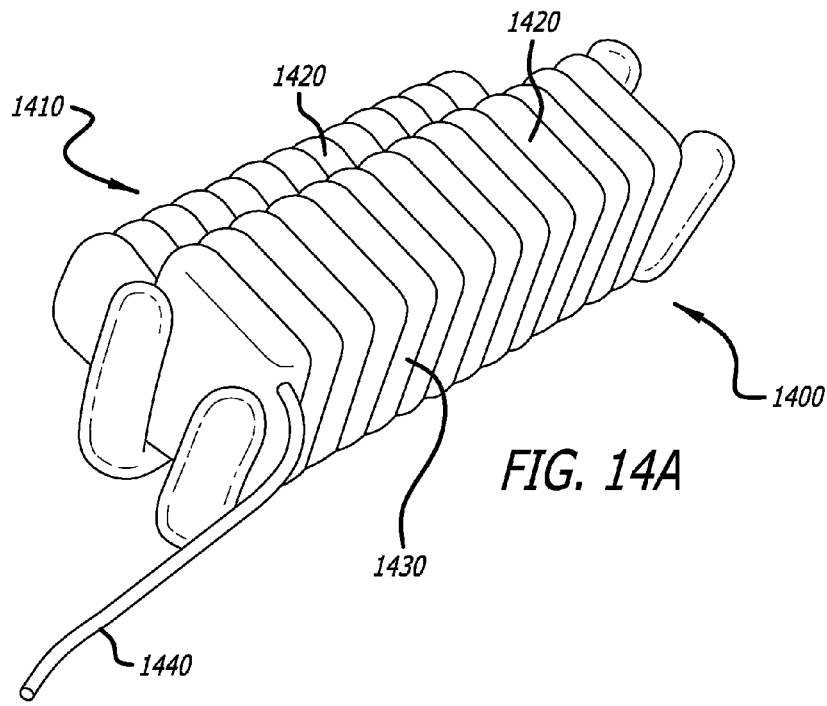
FIG. 14A is a diagram showing a side view of a fourth embodiment of the disclosed evacuation unit, in accordance with at least one embodiment of the present disclosure.

FIG. 14A is a diagram 1400 showing a side view of a fourth embodiment of the disclosed evacuation unit 1410, in accordance with at least one embodiment of the present disclosure. In this figure, the evacuation unit 1410 is shown to be constructed from an inflatable structure. The evacuation unit 1410 is shown to include a plurality of membrane ribs so as to form an accordion-type structure. It should be noted that in some embodiments, the evacuation unit 1410 may also include a foldable rigid structure (not shown) that is housed within the inflatable structure.

The evacuation unit 1410 is also shown to include two steps 1420 and a wave fence 1430. In addition, the evacuation unit 1410 is shown to include an inflating hose 1440. A source of air (not shown) is attached to the open end of the inflating hose 1440, and the source of air causes air to pass through the inflating hose 1440 and into the evacuation unit 1410 to inflate the evacuation unit 1410. Different types of means may be used for the source of air including, but not limited to, compressed air and/or at least one manual pump. It should be noted that the compressed air may be from various sources, such as from the inflatable slide 140 and/or from a separate pressurized gas bottle or aspirator.

Figure 14B:
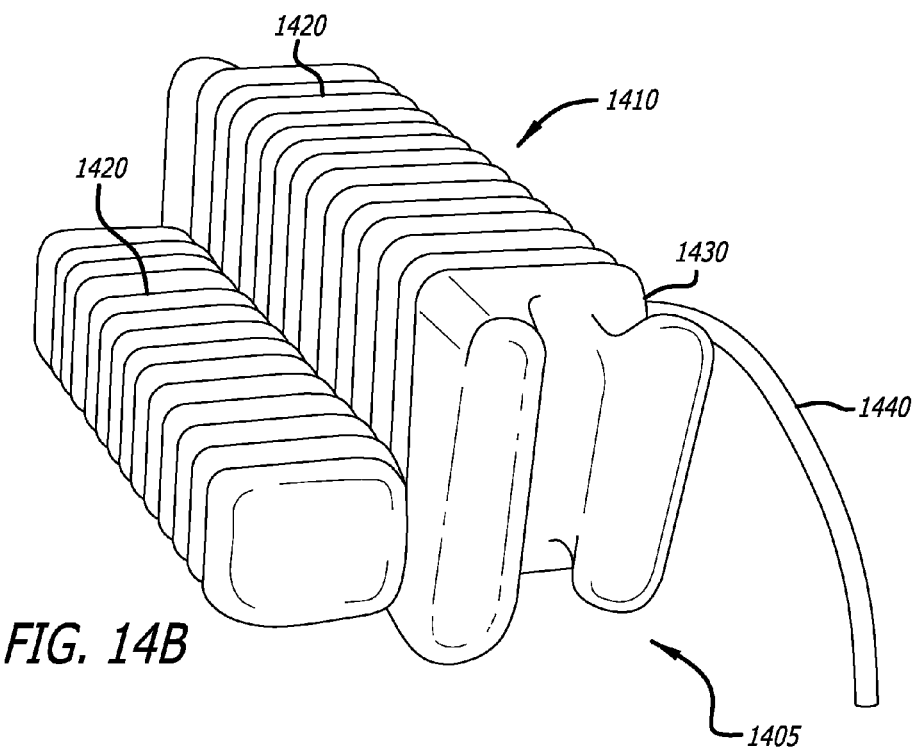
FIG. 14B is a diagram showing another side view of the fourth embodiment of the disclosed evacuation unit, in accordance with at least one embodiment of the present disclosure.

FIG. 14B is a diagram 1405 showing another side view of the fourth embodiment of the disclosed evacuation unit 1410, in accordance with at least one embodiment of the present disclosure.

Figure 15:
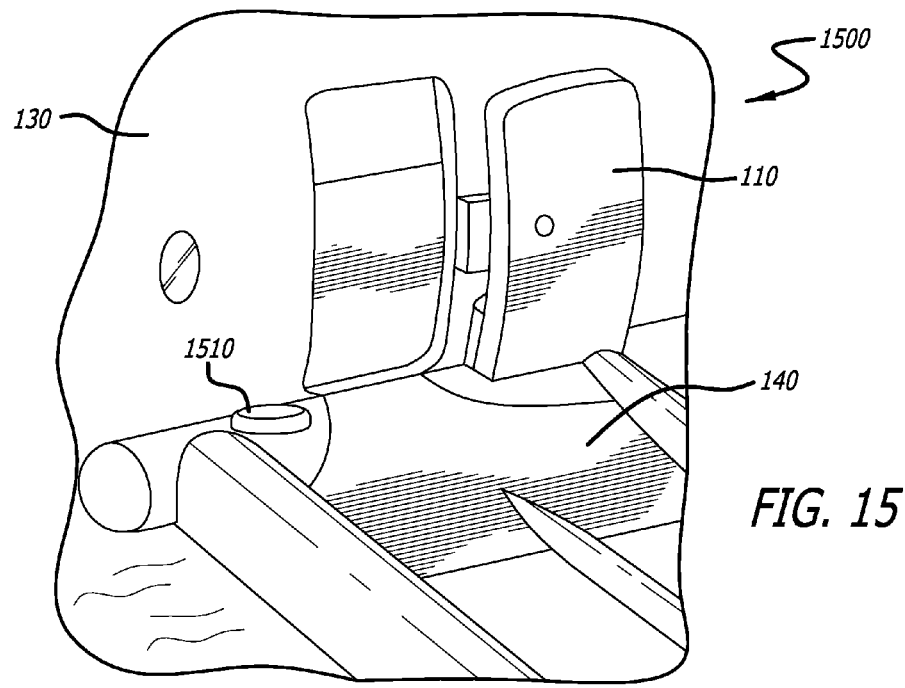
FIG. 15 is a diagram showing an exterior aircraft view of the fourth embodiment of the disclosed evacuation unit in a stowed position, in accordance with at least one embodiment of the present disclosure.

FIG. 15 is a diagram 1500 showing an exterior aircraft view of the fourth embodiment of the disclosed evacuation unit 1410 in a stowed position, in accordance with at least one embodiment of the present disclosure. In this figure, the aircraft door 110 of the aircraft 130 is shown to be open. Also in this figure, the inflatable slide 140 is shown to be deployed, and the inflatable slide 140 is shown to include a storage compartment (i.e. a storage housing) 1510 located near the aircraft door 110.

Also in this figure, the evacuation unit 1410 is shown to be in a stowed position. When stowed, the evacuation unit 1410 is housed within the storage housing 1510.

Figure 16:
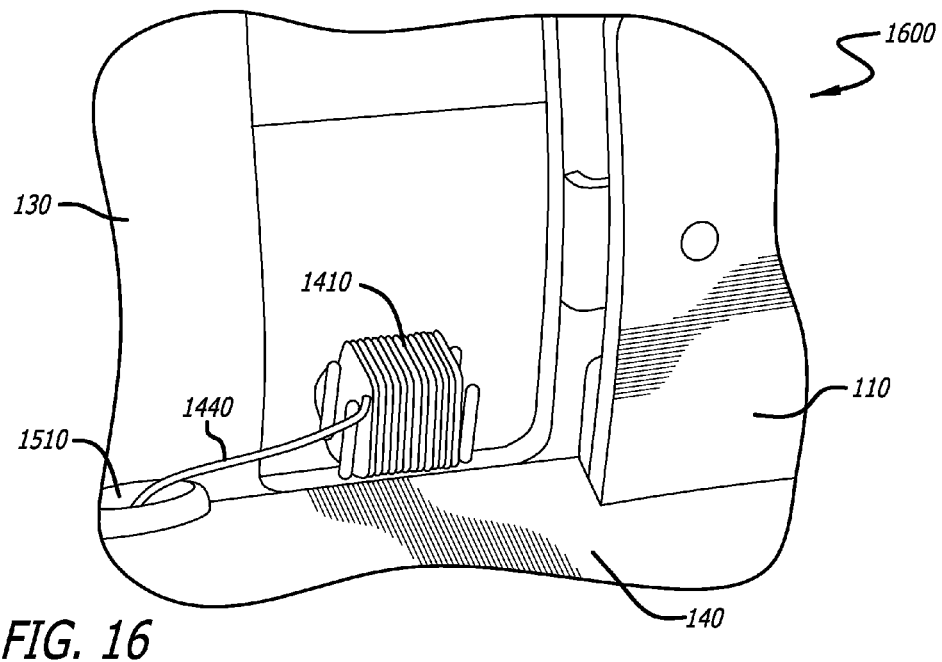
FIG. 16 is a diagram showing an exterior aircraft view of the fourth embodiment of the disclosed evacuation unit being deployed, in accordance with at least one embodiment of the present disclosure.

FIG. 16 is a diagram 1600 showing an exterior aircraft view of the fourth embodiment of the disclosed evacuation unit 1410 being deployed, in accordance with at least one embodiment of the present disclosure. For deployment of the evacuation unit 1410, the storage housing 1510 is opened to expose the evacuation unit 1410. The evacuation unit 1410 is removed from the storage housing 1510 and positioned within the frame of the aircraft door 110, as is shown in the figure. Then, a source of air is connected to an end of the inflating hose 1440 and is used to inflate the evacuation unit 1410 until it is fully deployed. In this figure, the source of air is located within the storage housing 1510. In other embodiments, as previously mentioned above, the source of air may be located in other areas other than the storage housing 1510.

FIG. 17 is a diagram 1700 showing an exterior aircraft view of the fourth embodiment of the disclosed evacuation unit 1410 being in a fully deployed position, in accordance with at least one embodiment of the present disclosure. When the evacuation unit 1410 is fully deployed, the evacuation unit 1410 fits snugly within the frame of the aircraft door 110, thereby creating a wave fence 1430. And, a clamp sleeve 1710 on either side of the evacuation unit 1410 clamps to the frame of the aircraft door 110 to assist in securing the evacuation unit 1410 when it is fully deployed.

FIG. 18 is a diagram 1800 showing an interior aircraft cabin view of the fourth embodiment of the disclosed evacuation unit 1410 being in a fully deployed position, in accordance with at least one embodiment of the present disclosure. In this figure, the evacuation unit 1410 is shown to be fully deployed, and the clamp sleeves 1710 are shown to be securely clamped to the frame of the aircraft door 110. In this figure, the two steps 1420 of the evacuation unit 1410 can be seen. The two steps 1420 are for the passengers to use during their egress from the aircraft 130.

Figure 19A:
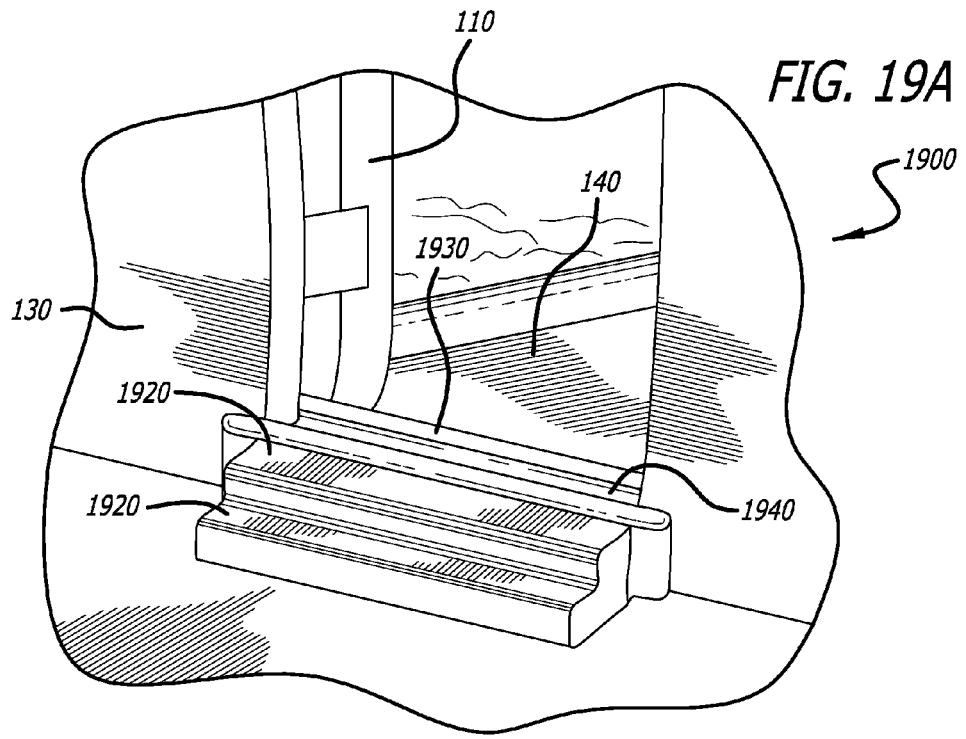
FIG. 19A is a diagram showing an interior aircraft cabin view of the fifth embodiment of the disclosed evacuation unit being in a fully deployed position, in accordance with at least one embodiment of the present disclosure.

FIG. 19A is a diagram 1900 showing an interior aircraft cabin view of the fifth embodiment of the disclosed evacuation unit 1910 being in a fully deployed position, in accordance with at least one embodiment of the present disclosure. In this figure, the evacuation unit 1910 is shown to be deployed and secured within the frame of the aircraft door 110 of the aircraft 130.

In this figure, the evacuation unit 1910 is shown to be constructed from an inflatable structure. The inflatable structure includes two steps 1920 and two inflatable sleeves 1930, 1940. It should be noted that in other embodiments, the evacuation unit 1910 may be constructed to have more or less than two steps 1920, and more or less than two inflatable sleeves 1930, 1940, as is shown in this figure.

When the evacuation unit 1910 is fully deployed, the two steps 1920 lie within the cabin of the aircraft 130, one inflatable sleeve 1940 lies within the frame of the aircraft door 110, and the other inflatable sleeve 1930 lies exterior to the aircraft 130, thereby creating a wave fence.

Figure 19B:
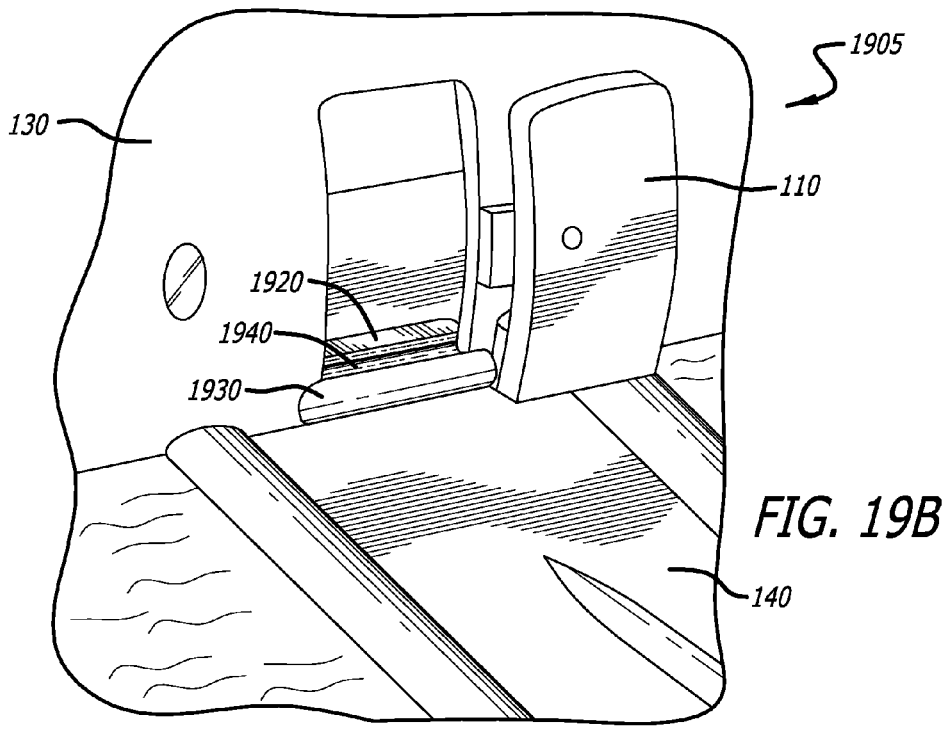
FIG. 19B is a diagram showing an exterior aircraft view of the fifth embodiment of the disclosed evacuation unit being in a fully deployed position, in accordance with at least one embodiment of the present disclosure.

FIG. 19B is a diagram 1905 showing an exterior aircraft view of the fifth embodiment of the disclosed evacuation unit 1910 being in a fully deployed position, in accordance with at least one embodiment of the present disclosure.

Figure 20:
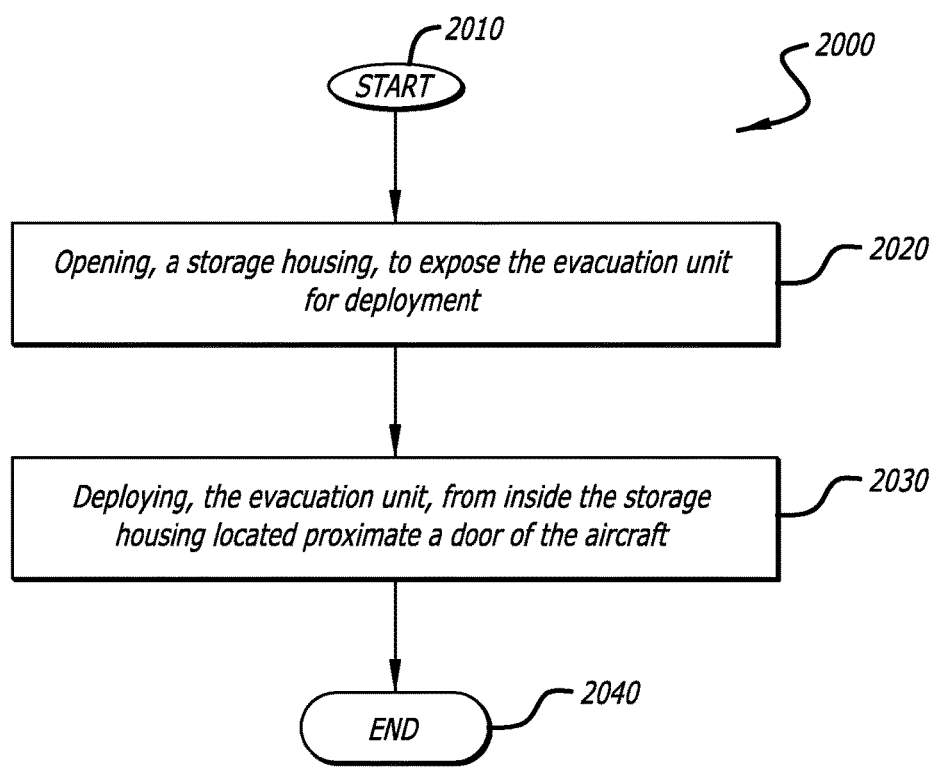
FIG. 20 is a flow chart showing the disclosed method for permitting evacuation of an aircraft following a water landing, in accordance with at least one embodiment of the present disclosure.

FIG. 20 is a flow chart 2000 showing the disclosed method for permitting evacuation of an aircraft following a water landing, in accordance with at least one embodiment of the present disclosure. At the start 2010 of the method 2000, optionally, a storage housing is opened to expose the evacuation unit for deployment 2020. Then, the evacuation unit is deployed from inside the storage housing, which is located proximate a door region of the aircraft 2030. In one or more embodiments, the evacuation unit comprises at least one step and a wave fence. In at least one embodiment, when the evacuation unit is fully deployed, at least a portion of the wave fence is in water-tight contact with at least a portion of a frame of the door such that water flow into the aircraft is prevented and/or inhibited. Then, the method 2000 ends 2040.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the embodiment. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for permitting evacuation of an aircraft following a water landing, the method comprising:
   deploying an evacuation unit of the aircraft from inside a storage housing located proximate a door of the aircraft,
   wherein the evacuation unit comprises at least two step, a wave fence, and an infrastructure comprising a plurality of bars, and
   wherein when the evacuation unit is fully deployed, at least a portion of the wave fence is in water-tight contact with at least a portion of a frame of the door such that water flow into the aircraft is at least one of prevented and inhibited.

2. The method of claim 1, wherein a top step of the at least two steps comprises an upper surface of the wave fence upon which an occupant evacuating the aircraft can step.

3. The method of claim 1, wherein the storage housing is one of located under at least one floor panel, located on a portion of an inflatable slide, located on an interior wall of the aircraft, and located on an exterior wall of the aircraft.

4. The method of claim 1, wherein the method further comprises opening the storage housing to expose the evacuation unit for deployment.

5. The method of claim 1, wherein after deployment of the evacuation unit, the wave fence is located at least one of interior to the aircraft and exterior to the aircraft.

6. The method of claim 1, wherein the infrastructure is foldable.

7. The method of claim 6, wherein the deploying of the evacuation unit comprises unfolding the infrastructure by at least one of compressed gas, hydraulics, electrical power, pneumatics, at least one spring, and at least one manual pump.

8. The method of claim 6, wherein the method further comprises:
attaching, to a first location proximate a first side of the frame of the door, a first side of the wave fence; and
attaching, to a second location proximate a second side of the frame of the door, a second side of the wave fence.

9. The method of claim 8, wherein the attaching of the first side of the wave fence to the first location and the attaching of the second side of the wave fence to the second location are via at least one of at least one rail, at least one fastener, and at least one zipper.

10. An apparatus for permitting evacuation of an aircraft following a water landing, the apparatus comprising:
at least two steps;
a wave fence;
an infrastructure comprising a plurality of bars; and
a storage housing located at least partially within a floor of the aircraft and located proximate a door of the aircraft,
wherein the apparatus of the aircraft is to be deployed from inside the storage housing, and
wherein when the apparatus is fully deployed, at least a portion of the wave fence is in water-tight contact with at least a portion of a frame of the door such that water flow into the aircraft is at least one of prevented and inhibited.

11. The apparatus of claim 10, wherein a top step of the at least two steps comprises an upper surface of the wave fence upon which an occupant evacuating the aircraft can step.

12. The apparatus of claim 10, wherein the infrastructure is foldable.

13. The apparatus of claim 12, wherein the apparatus is configured to deploy by unfolding the infrastructure by at least one of compressed gas, hydraulics, electrical power, pneumatics, at least one spring, and at least one manual pump.

14. A system for permitting evacuation of an aircraft following a water landing, the system comprising:
an evacuation unit of the aircraft to be deployed from inside a storage housing,
wherein the evacuation unit comprises at least two step, a wave fence, and an infrastructure comprising a plurality of bars; and
the storage housing located at least partially within a floor of the aircraft and located proximate a door of the aircraft; and
wherein when the evacuation unit is fully deployed, at least a portion of the wave fence is in water-tight contact with at least a portion of a frame of the door such that water flow into the aircraft is at least one of prevented and inhibited.

15. The system of claim 14, wherein a top step of the at least two steps comprises an upper surface of the wave fence upon which an occupant evacuating the aircraft can step.

16. The system of claim 14, wherein the infrastructure is foldable.

17. The system of claim 16, wherein the evacuation unit is configured to deploy by unfolding the infrastructure by at least one of compressed gas, hydraulics, electrical power, pneumatics, at least one spring, and at least one manual pump.

* * * * *

UNITED STATES PATENT AND TRADEMARK OFFICE
CERTIFICATE OF CORRECTION

PATENT NO.        : 9,902,485 B2
APPLICATION NO.   : 14/311105
DATED             : February 27, 2018
INVENTOR(S)       : Sergey Barmichev, Mithra Sankrithi and David Eckert Page 1 of 1

It is certified that error appears in the above-identified patent and that said Letters Patent is hereby corrected as shown below:

On the Title Page

Item (54):
The Title should read:
AIRPLANE DOOR RETRACTRABLE WAVE FENCE WITH STEPS FOR EVACUATION In the Claims Claim 1, Column 10, Line 47, change "two step" to --two steps--.

Claim 14, Column 12, Line 13, change "two step" to --two steps--.

Signed and Sealed this
Tenth Day of April, 2018

Andrei Iancu
*Director of the United States Patent and Trademark Office*